United States Patent
Ishikawa et al.

(10) Patent No.: US 12,251,728 B2
(45) Date of Patent: Mar. 18, 2025

(54) ADHESIVE COATING DEVICE, ADHESIVE COATING METHOD, AND ROTOR MANUFACTURING METHOD

(71) Applicants: TOSHIBA INDUSTRIAL PRODUCTS AND SYSTEMS CORPORATION, Kawasaki (JP); TOSHIBA INFRASTRUCTURE SYSTEMS & SOLUTIONS CORPORATION, Kawasaki (JP)

(72) Inventors: Yuji Ishikawa, Mie-gun (JP); Hiroyuki Sano, Mie-gun (JP); Yoshihiro Igarashi, Kawasaki (JP)

(73) Assignees: Toshiba Industrial Products and Systems Corporation, Kawasaki (JP); Toshiba Infrastructure Systems & Solutions Corporation, Kawasaki (JP)

( * ) Notice: Subject to any disclaimer, the term of this patent is extended or adjusted under 35 U.S.C. 154(b) by 221 days.

(21) Appl. No.: 17/769,959

(22) PCT Filed: Mar. 6, 2020

(86) PCT No.: PCT/JP2020/009679
§ 371 (c)(1),
(2) Date: Apr. 18, 2022

(87) PCT Pub. No.: WO2021/079540
PCT Pub. Date: Apr. 29, 2021

(65) Prior Publication Data
US 2022/0355337 A1    Nov. 10, 2022

(30) Foreign Application Priority Data
Oct. 25, 2019  (JP) ................. 2019-194403

(51) Int. Cl.
*B05C 11/10*   (2006.01)
*B05C 5/02*    (2006.01)
*B05C 7/02*    (2006.01)
*B05D 1/26*    (2006.01)
*B05D 5/10*    (2006.01)
*B05D 7/24*    (2006.01)
*H02K 1/27*    (2022.01)
*B05D 7/22*    (2006.01)
*H02K 15/02*   (2006.01)

(52) U.S. Cl.
CPC .............. *B05D 7/24* (2013.01); *B05C 5/0216* (2013.01); *B05C 5/0225* (2013.01); *B05C 7/02* (2013.01);
(Continued)

(58) Field of Classification Search
None
See application file for complete search history.

(56) References Cited

U.S. PATENT DOCUMENTS 3,797,456 A * 3/1974 Hogstrom ................. B05B 1/04
                                                        118/316
4,025,664 A * 5/1977 Gerek ................. B05B 13/0609
                                                        427/195
(Continued)

FOREIGN PATENT DOCUMENTS

| JP | 2007-159361 A |   | 6/2007  |
| JP | 2015-204693 A |   | 11/2015 |
| JP | 2018008210 A  | * | 1/2018  |

OTHER PUBLICATIONS

International Search Report issued Apr. 14, 2020 in PCT/JP2020/009679 filed on Mar. 6, 2020, 2 pages.

*Primary Examiner* — Binu Thomas
(74) *Attorney, Agent, or Firm* — Maier & Maier, PLLC

(57) ABSTRACT

An adhesive coating device for coating an inner wall surface of a workpiece provided with holes with an adhesive. A control device automatically executes an operation of applying the adhesive, the operation including positioning of the workpiece, relative positioning of a nozzle that applies the adhesive in a non-contact manner with respect to the workpiece, and moving of the nozzle, in which the adhesive is ejected and applied in an oblique direction from the nozzle to the inner wall surface of the hole, and the angle of the oblique direction is such an angle that the adhesive linearly ejected from the nozzle located outside the hole can be applied to the inner wall surface of the hole with a desired depth without interfering with an opening part of the hole.

4 Claims, 9 Drawing Sheets

(52) U.S. Cl.
CPC ...... *B05C 11/1002* (2013.01); *B05C 11/1021* (2013.01); *B05D 1/26* (2013.01); *B05D 5/10* (2013.01); *B05C 5/027* (2013.01); *B05D 7/225* (2013.01); *H02K 1/27* (2013.01); *H02K 15/02* (2013.01)

(56) References Cited

U.S. PATENT DOCUMENTS

| | | | | |
|---|---|---|---|---|
| 4,515,187 | A * | 5/1985 | Schaumburg | H01M 50/112 |
| | | | | 118/680 |
| 4,963,391 | A * | 10/1990 | Bair | H02K 15/12 |
| | | | | 427/116 |
| 5,078,313 | A * | 1/1992 | Matheson | B05B 13/0627 |
| | | | | 118/314 |
| 5,474,799 | A * | 12/1995 | Thigpen | H02K 15/12 |
| | | | | 118/313 |
| 2006/0165879 | A1 * | 7/2006 | Kimura | H02K 15/12 |
| | | | | 118/52 |
| 2013/0032090 | A1 * | 2/2013 | Yano | B25J 9/1679 |
| | | | | 118/706 |
| 2014/0079871 | A1 * | 3/2014 | Lu | B05C 11/1021 |
| | | | | 118/712 |
| 2018/0084833 | A1 * | 3/2018 | Ampolini | B61B 13/04 |

* cited by examiner

| TYPE | OPENING HEIGHT h | APPLICATION DEPTH z | APPLICATION THICKNESS t | MINIMUM APPLICATION ANGLE $\theta s°$ | MAXIMUM APPLICATION ANGLE $\theta m°$ |
|---|---|---|---|---|---|
| MAGNET INSERTION HOLE 3 | 2 | 14 | 0.7 | 4.09 | 5.31 |
| MAGNET INSERTION HOLE 2 | 3 | 14 | 0.7 | 6.12 | 9.33 |

ADHESIVE COATING DEVICE, ADHESIVE COATING METHOD, AND ROTOR MANUFACTURING METHOD

CROSS-REFERENCE TO RELATED APPLICATION

The present application is based on PCT/JP2020/009679 filed on Mar. 6, 2020, which is based on Japanese Application No. 2019-194403 filed on Oct. 25, 2019, the entire contents of each of which is incorporated herein.

TECHNICAL FIELD

An embodiment of the present invention relates to an adhesive coating device, an adhesive coating method, and a rotor manufacturing method.

BACKGROUND ART

For example, a rotor of a permanent magnet-type rotating electrical machine is configured to include permanent magnets embedded into a plurality of magnet insertion holes that are provided in a rotor core to penetrate therethrough in an axial direction. In this case, inner surfaces of the magnet insertion holes are coated with an adhesive, and the permanent magnets are inserted into the magnet insertion holes and are secured thereto through adhesion. Patent Literature 1 discloses that inside of magnet insertion hole of a rotor core is coated with an adhesive for adhesion of permanent magnet. To apply the adhesive, the adhesive is placed at a tip of a spatula, and the spatula is horizontally inserted into the magnet insertion hole and is pressed onto the inner surface of the insertion hole to thereby apply the adhesive.

CITATION LIST

Patent Literature

Patent Literature 1: Japanese Patent Laid-Open No. 2007-159361 (FIG. 2)

SUMMARY OF INVENTION

Technical Problem

In recent years, as a rotor of this type, a double-layer-type rotor in which thin permanent magnets are disposed in two layers at a part near an outer periphery of a rotor core have been developed. In this case, magnet insertion holes into which the permanent magnets are inserted are thin and flat, which causes a necessity to coat inner surfaces of the magnet insertion holes with such flat shapes with an adhesive. Specifically, rotors including magnet insertion holes with dimensions in the height direction equal to or less than 2.0 mm have been developed.

However, in the adhesive coating method using a spatula as described in Patent Literature 1, the thickness dimension of the spatula is 0.8 mm, and the adhesive supplied to the upper surface thereof is in a raised form with a height of about 1 to 2 mm. Therefore, it is difficult to insert the spatula into the magnet insertion hole and apply the adhesive for the thin and flat magnet insertion hole.

Thus, an adhesive coating device and an adhesive coating method for coating an inner surface of a hole with a flat shape with an adhesive which enable to satisfactorily coat a thin hole with an adhesive, and a rotor manufacturing method are provided.

Solution to Problem

An adhesive coating device according to an embodiment is an adhesive coating device for coating an inner wall surface of a hole of a workpiece provided with holes with an adhesive, the device including a workpiece holding unit that holds the workpiece, a jet-type dispenser that applies the adhesive in a non-contact manner by forming microparticles from the adhesive in a liquid form and linearly and successively ejecting the microparticles from a nozzle, a moving mechanism that causes a relative position of the nozzle of the dispenser to freely move with respect to the hole of the workpiece, and a control device that controls the mechanism and causes the mechanism to automatically execute an operation of applying the adhesive, the operation including positioning of the workpiece, relative positioning of the nozzle with respect to the workpiece, and moving of the nozzle, in which the adhesive is ejected and applied in an oblique direction from the nozzle to the inner wall surface of the hole, and the angle of the oblique direction is such an angle that the adhesive linearly ejected from the nozzle located outside the hole is able to be applied to the inner wall surface of the hole with a desired depth without interfering with the opening part of the hole.

An adhesive coating method according to an embodiment is a method for coating an inner wall surface of a hole of a workpiece provided with holes with an adhesive, the method including an adhesive coating step of coating the hole of the workpiece with the adhesive while causing a nozzle of a jet-type dispenser to move, the dispenser being adapted to apply the adhesive in a non-contact manner by forming microparticles from the adhesive in a liquid form and linearly and successively ejecting the microparticles from the nozzle, in which in the adhesive coating step, the adhesive is ejected and applied in an oblique direction from the nozzle to the inner wall surface of the hole, and the angle of the oblique direction is such an angle that the adhesive linearly ejected from the nozzle located outside the hole is able to be applied to the inner wall surface of the hole with a desired depth without interfering with the opening part of the hole.

DESCRIPTION OF EMBODIMENT

Figure 8:
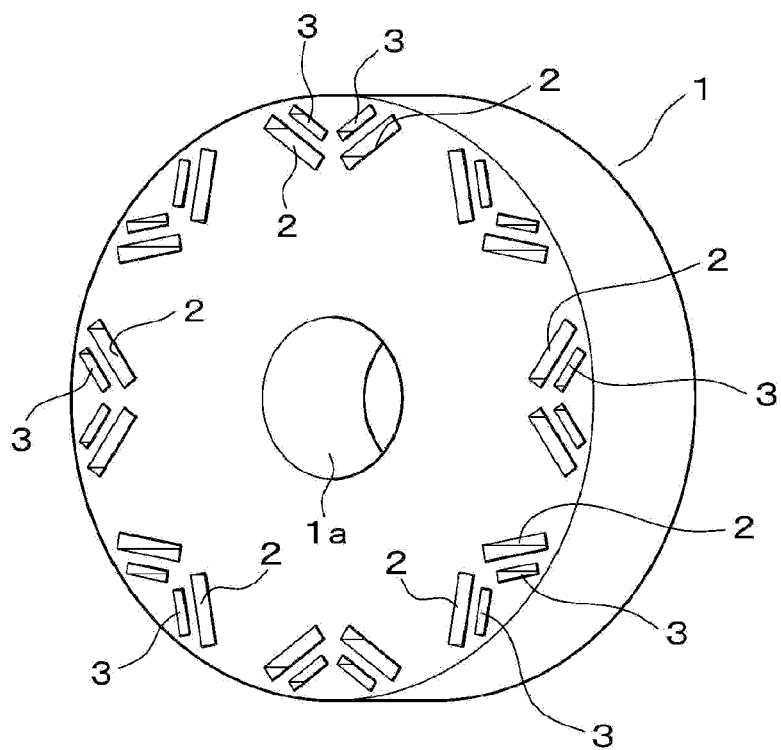
FIG. 8 is a perspective view schematically illustrating an appearance of a rotor core according to the embodiment.

Hereinafter, an embodiment applied to an operation of causing permanent magnets to adhere to magnet insertion holes of a rotor core will be described with reference to the drawings. The present embodiment is applied to manufacturing of a rotor of a permanent magnet-type rotating electrical machine. First, FIG. 8 illustrates an appearance configuration of a so-called double-layer-type rotor core 1 as a workpiece that is an adhesive application target in the present embodiment. The rotor core 1 is configured by punching an electromagnetic steel sheet into a predetermined shape, that is, substantially a disc shape, and laminating a plurality of punched electromagnetic steel sheets. A shaft hole 1a for insertion of a rotation shaft, which is not illustrated, is formed at the center portion of the rotor core 1.

Also, magnet insertion holes 2 and 3 as holes into which permanent magnets that are not illustrated are inserted and secured through adhesion are formed to penetrate in an axial direction through portions of the rotor core 1 near the outer periphery. Specifically, each of the magnet insertion holes 2 has a flat shape, that is, a long and thin shape, and eight sets, that is, eight pairs of the magnet insertion holes 2 are formed in an equally aligned manner in a circumferential direction, for example, such that each two magnet insertion holes 2 form a pair with a topless inverted V shape. Each of the magnet insertion holes 3 also has a flat shape, that is, a long and thin shape and is located on the outer periphery side of the corresponding magnet insertion hole 2, and eight sets, that is, eight pairs of the magnet insertion holes 3 are formed, for example, such that each two form a pair with a topless inverted V shape.

Here, the magnet insertion holes 3 on the outer periphery side are configured to be smaller than the magnet insertion holes 2 on the inner periphery side. Each of the magnet insertion holes 2 has, for example, a width dimension of 15 mm and a height, that is, a thickness dimension of 3 mm. Each of the magnet insertion holes 3 has, for example, a width dimension of 9 mm and a height, that is, a thickness dimension of 2 mm. It is a matter of course that the permanent magnets to be inserted and caused to adhere are formed to have a size corresponding to the dimensions of the magnet insertion holes 2 and 3, and each of the permanent magnets is formed to have a dimension that is smaller than the dimension of the corresponding magnet insertion hole by 0.1 mm in both vertical and horizontal directions, for example.

Figure 1:
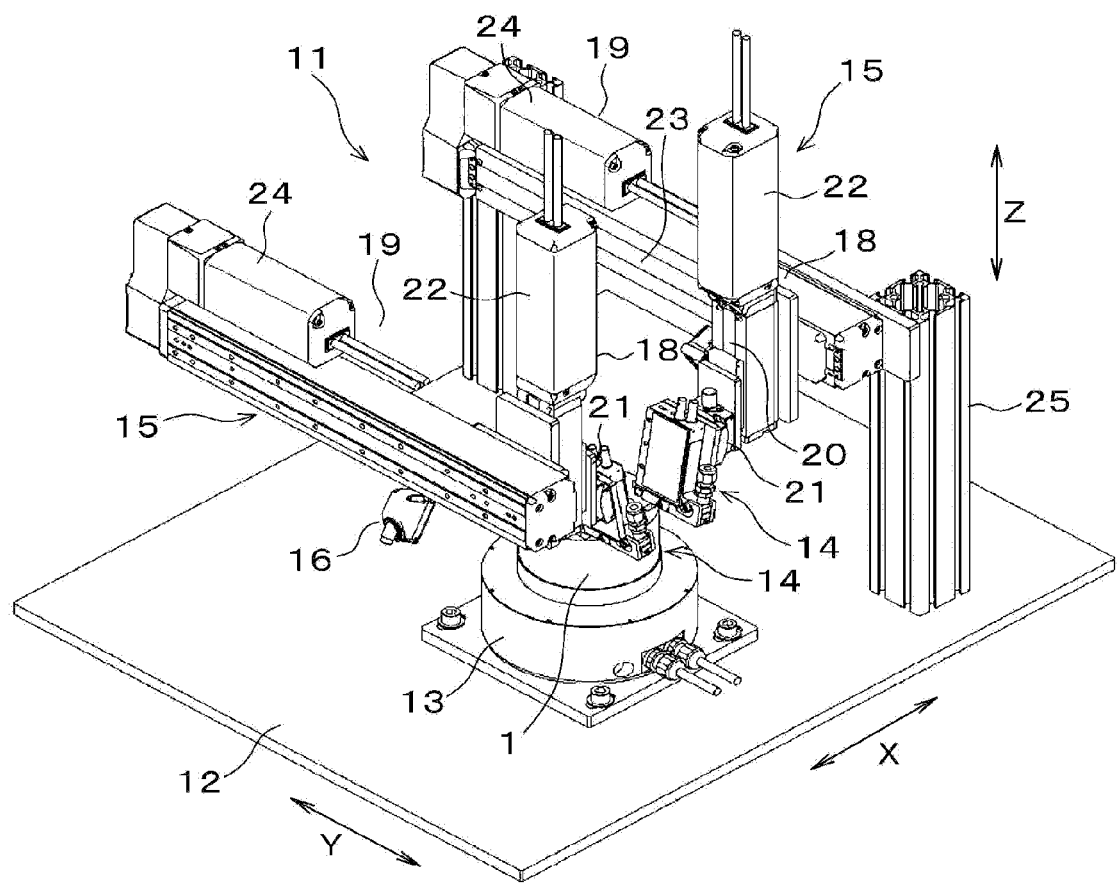
FIG. 1 is a perspective view schematically illustrating a configuration of an adhesive coating device according to an embodiment.
Figure 2:
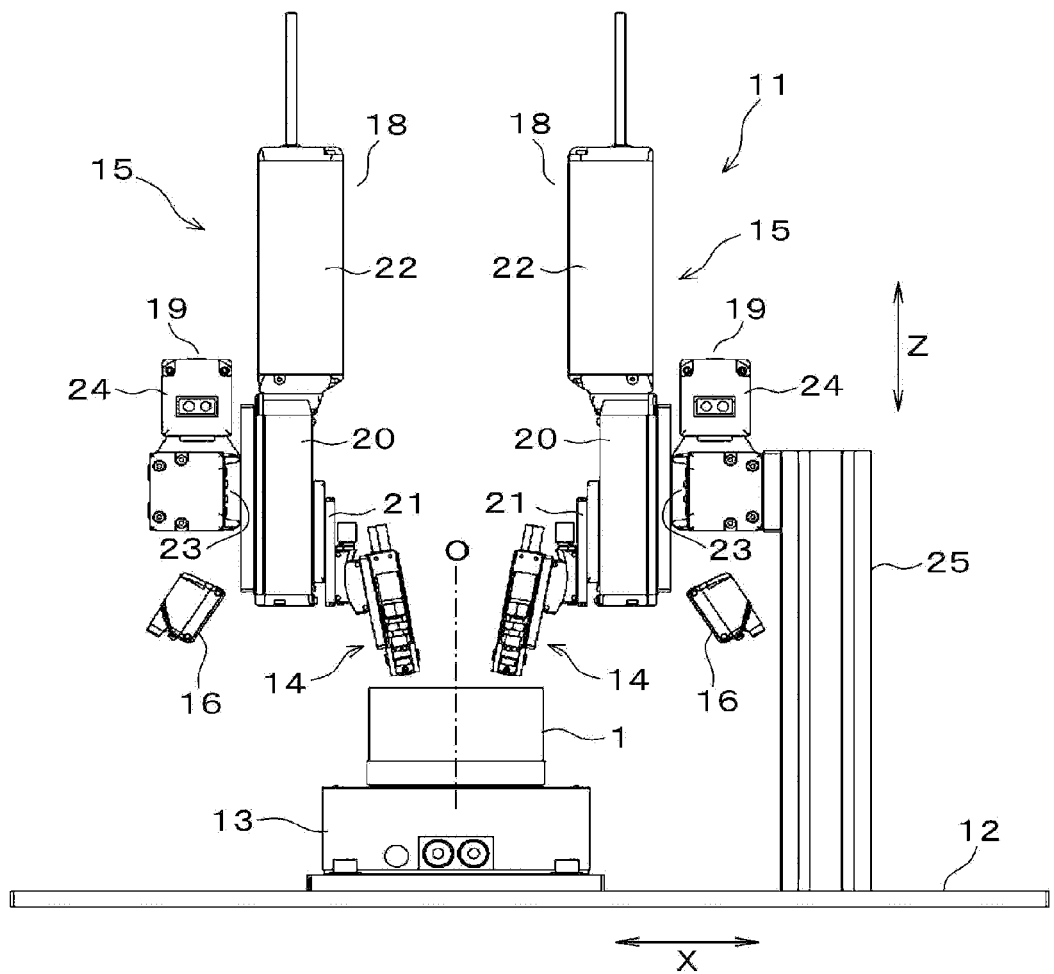
FIG. 2 is a front view schematically illustrating the configuration of the adhesive coating device according to the embodiment.
Figure 3:
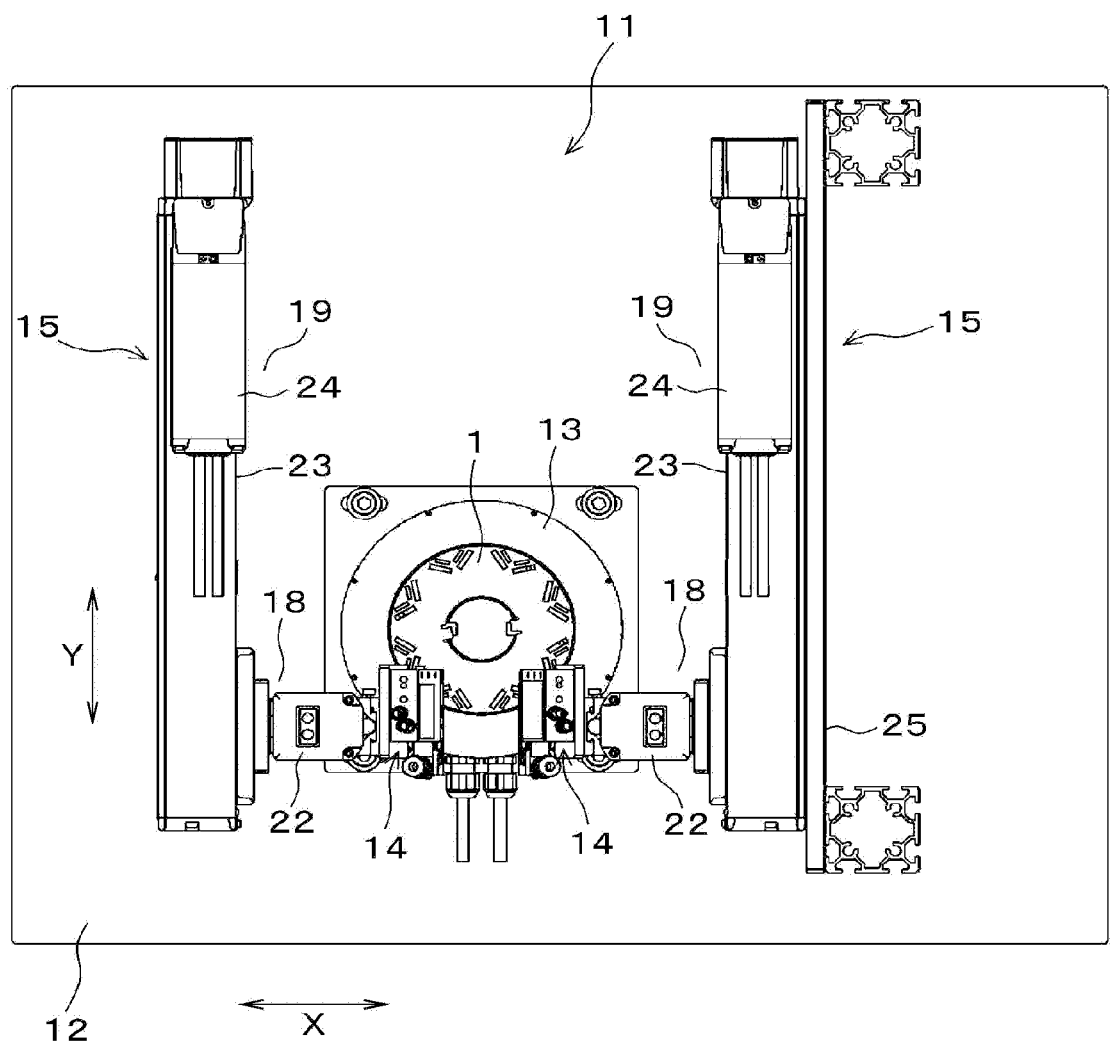
FIG. 3 is a top view schematically illustrating the configuration of the adhesive coating device according to the embodiment.

Next, a configuration of an adhesive coating device 11 that coats the inner surfaces of the magnet insertion holes 2 and 3 formed in the rotor core 1 with an adhesive to secure the permanent magnets will be described with reference to FIGS. 1 to 7. FIGS. 1 to 3 schematically illustrate an appearance configuration of the adhesive coating device 11 according to the present embodiment. Here, the adhesive coating device 11 includes an index table 13 that serves as a workpiece holding unit, dispense heads 14 formed of jet-type dispensers, robots 15 that serve as moving mechanisms, image sensors 16, and the like on a base 12 having an upper surface with a horizontal table shape.

Here, two sets of the robots 15, two sets of the dispense heads 14, and two sets of the image sensors 16 are respectively symmetrically provided on the left and right sides over the base 12. Also, the adhesive coating device 11 includes a control device 17 (illustrated only in FIG. 7) that controls each of the aforementioned mechanisms 13 to 16. Note that the adhesive coating device 11 has a unique XYZ coordinate system, and the following description will be given on the assumption that the left-right direction in the drawing of the base 12 is an X direction, the front-back direction is a Y direction, and the up-down direction is a Z direction.

The index table 13 is configured to hold the rotor core 1 such that the center axis O thereof is vertical and cause the rotor core 1 held by a rotation drive mechanism including a motor to freely rotate about the center axis O as illustrated in FIG. 2 and the like. In this case, the index table 13 is adapted to cause the rotor core 1 to move such that the magnet insertion holes 2 and 3 as adhesive application targets successively come to a predetermined application position. The direction in which the magnet insertion holes 2 and 3 extend, that is, a longitudinal direction conforms to the Y direction, which is the front-back direction, at the application position. In this manner, an inner surface of each of the magnet insertion holes 2 and 3 to which the adhesive is applied is made parallel to the YZ plane during the operation of applying the adhesive.

Each robot 15 is a known orthogonal coordinate-type robot and includes a Z-axis moving mechanism 18 and a Y-axis moving mechanism 19 in this case as illustrated in FIG. 1 and the like. The Z-axis moving mechanism 18 is configured to cause a moving body 21 that is provided to be movable along a Z-axis rail 20 extending in the up-down direction to freely move in the up-down direction using a drive mechanism including a Z-axis motor 22 as a drive source. The Y-axis moving mechanism 19 is configured to support the Z-axis moving mechanism 18 movably along a Y-axis rail 23 extending in the front-back direction and cause the Z-axis moving mechanism 18 to freely move in the front-back direction using a drive mechanism including a Y-axis motor 24 as a drive source. Note that although the Y-axis rail 23 of the Y-axis moving mechanism 19 is supported above the base 12 via a so-called gate-shaped support unit 25, illustration of the support unit 25 for the robot 15 on the left side is omitted in FIGS. 1 to 3.

The dispense head 14, which will be described next, is attached to the moving body 21. In this manner, the robot 15 can cause the dispense head 14 to freely move to an arbitrary position in the Y direction, that is, the front-back direction and in the Z direction, that is, the up-down direction. In this case, the robot 15 causes a nozzle (which will be described later) of the dispense head 14 to be located on the upper side of the application positions, that is, the upper side and outside the predetermined one of magnet insertion holes 2 and 3 of the rotor core 1 held by the index table 13. In this manner, the application operation of applying the adhesive to the inner wall surfaces of the magnet insertion holes 2 and 3 from the upper side in a non-contact manner is executed as will be described later in detail.

Figure 4:
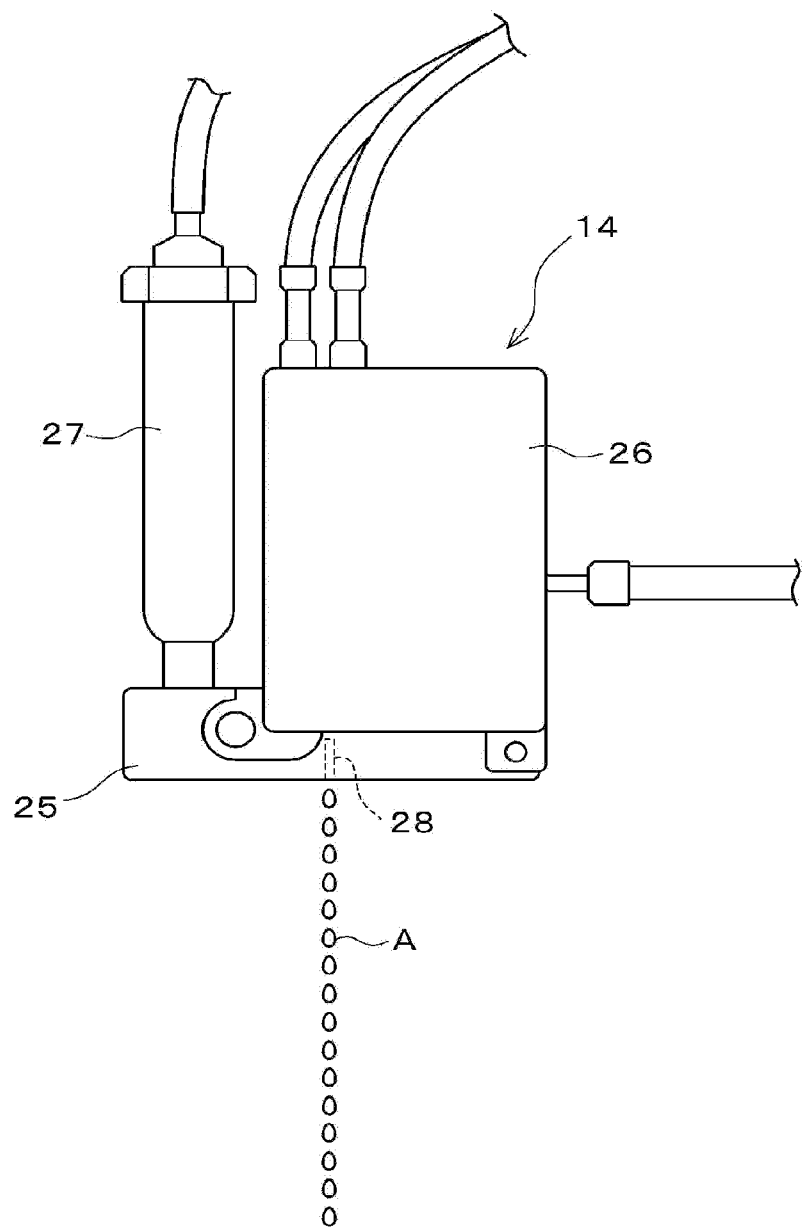
FIG. 4 is a side view illustrating an appearance of a dispenser head portion according to the embodiment.

The dispense head 14 is adapted to apply the adhesive in a non-contact manner and is formed of known jet-type dispensers that forms microparticles from the adhesive in a liquid form and linearly and successively ejects the microparticles from the nozzle. In FIG. 4, the microparticles of the adhesive are illustrated with a reference sign A. As illustrated in FIG. 4, the dispense head 14 includes a main body portion 26, a syringe 27 that stores the adhesive in the liquid form, and the like. A lower end portion of the main body portion 26 is provided with a nozzle 28 directed downward. In the present embodiment, a nozzle with a very small inner diameter, for example, a diameter of 0.1 mmφ is employed as the nozzle 28. Also, an adhesive with viscosity of about 100 Pa·s is used as the adhesive. In order to improve visibility in an inspection step, predetermine coloring may be applied to the adhesive.

Although not illustrated in detail, the main body portion 26 includes, in a rectangular case, a liquid chamber to which the adhesive is supplied from the syringe 27. In addition, a valve actuator of a piezoelectric drive scheme, for example, that forms microparticles from the adhesive in the liquid chamber, pushed out a predetermined amount of liquid droplets, and causes the nozzle 28 to linearly and successively eject the droplets downward is included. This can linearly and continuously eject the adhesive at 0.04 mL/time and 500 Hz, that is, 500/s, for example. the adhesive of the viscosity up to about 200 Pa·s can be used.

Figure 5:
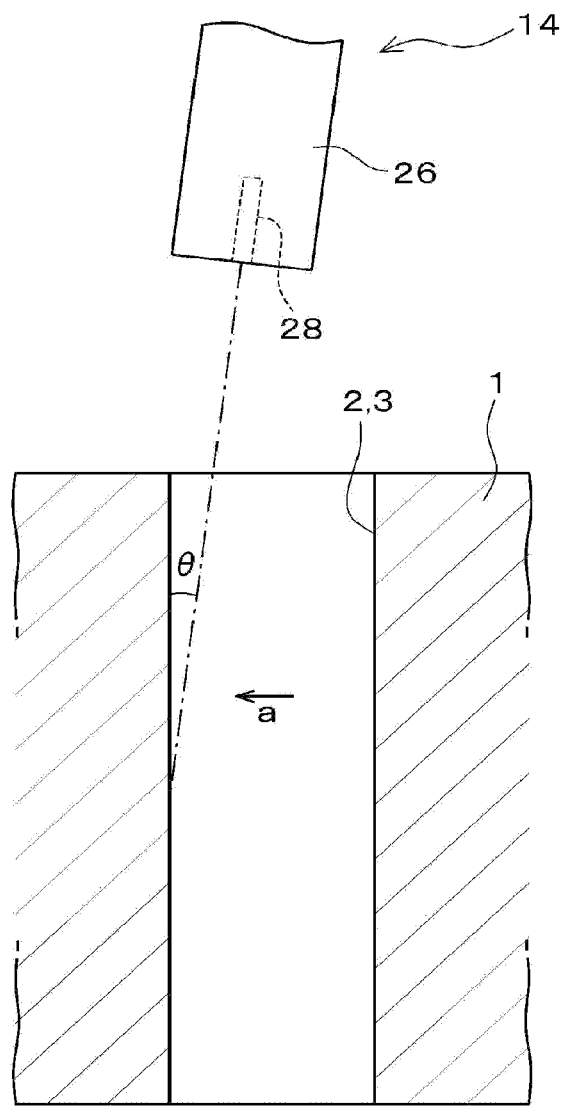
FIG. 5 is a side view illustrating a positional relationship between a nozzle and a magnet insertion hole during an operation according to the embodiment.
Figure 6:
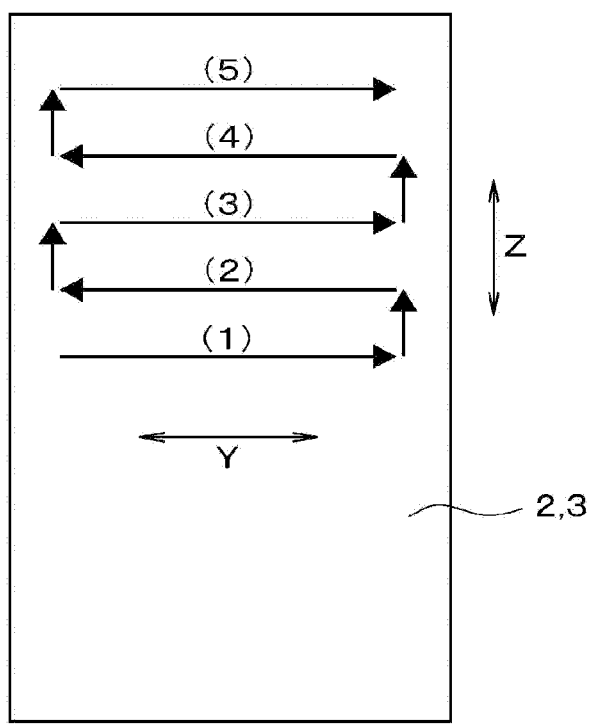
FIG. 6 is a diagram (a diagram in the direction of the arrow a in FIG. 5) illustrating a moving pattern of the nozzle during a coating operation according to the embodiment.

The dispense head 14 is attached to an attachment flange of the moving body 21 of the robot 15. At this time, the nozzle 28 of the dispense head 14 is disposed in an inclined form with respect to a vertical axis, that is, the Z axis, as illustrated in FIG. 5. In this manner, an adhesive A can be ejected and applied in an oblique direction from the nozzle 28 to the inner wall surface of each magnet insertion holes 2 and 3 of the rotor core 1 as illustrated in FIG. 5. Also, an inclination angle θ at that time is such an angle that the adhesive A linearly ejected from the nozzle 28 located outside each magnet insertion hole 2 and 3 can be applied to the inner wall surface of each magnet insertion hole 2 and 3 with a desired depth without interfering with the opening part of each magnet insertion holes 2 and 3. More specifically, the inclination angle θ of the nozzle 28 is set to fall within a range between a minimum angle θs and a maximum angle θm as will be described next. In a specific example, the inclination angle θ is set to fall within a range of 4° to 10°, for example.

Figure 9:
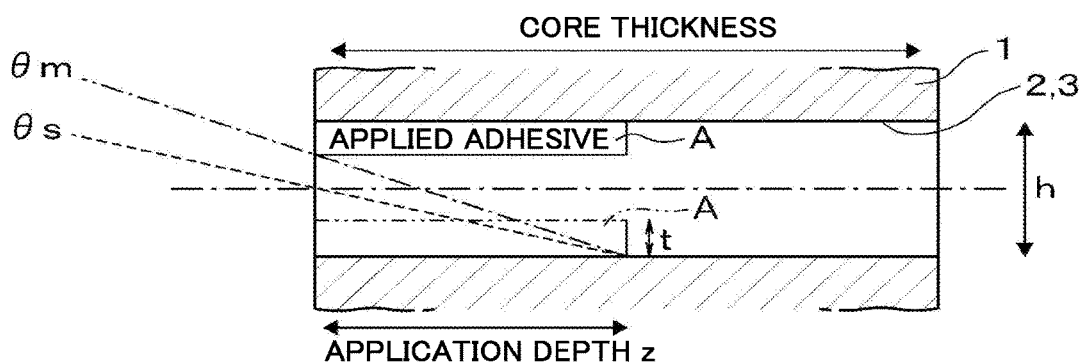
FIG. 9 is a diagram for explaining a minimum angle and a maximum angle of an inclination angle of the nozzle according to the embodiment.

Here, the minimum angle θs and the maximum angle θm for the inclination angle θ of the nozzle 28 with which the adhesive A can be ejected and applied without interfering with the opening part of each magnet insertion holes 2 and 3 will be described with reference to FIG. 9. FIG. 9 illustrates a state of a section at the portion of the magnet insertion holes 2 and 3. The minimum angle θs and the maximum angle θm are related to an opening height dimension h of each magnet insertion holes 2 and 3, that is, a distance h between an inner wall surface as an application target and a facing inner wall surface, a coating depth dimension z of the inner wall surface of each magnet insertion holes 2 and 3 from the opening part, and a coating thickness dimension t of the adhesive A. The minimum angle θs and the maximum angle θm can be represented by the following equations.

$$\text{Minimum angle } \theta s = \text{DEG}(A\ \text{TAN}(h/2/z))$$

$$\text{Maximum angle } \theta m = \text{DEG}(A\ \text{TAN}((h/2-t/z))$$

FIG. 9 also illustrates results of calculating the minimum angles θs and the maximum angles θm of two types of holes with different opening height dimensions h.

Note that at this time, with regard to application conditions, 1) the adhesive A is applied to both surfaces of the hole, that is, upper and lower surfaces in the drawing, 2) the application is performed from the further side toward the opening side of the hole, 3) an application amount, that is, an application thickness and an application width can be more easily controlled when the angle θ is larger, 4) the angle θ is affected by the application thickness of the adhesive A, and 5) the application is not limited to application from openings on both sides of the hole and can be performed only from one side depending on the core thickness or the opening height dimension h.

As illustrated in FIG. 2 and the like, each image sensor 16 is formed of a CCD camera, for example, is located on an obliquely upper side of the index table 13, and is attached below the Y-axis rail 23. In this manner, the image sensor 16 can image the inner wall surface of each magnet insertion hole 2 and 3 of the rotor core 1 located at the application position. As will be described later, the control device 17 executes an inspection step for checking whether the operation of applying the adhesive to the inner wall surface of each magnet insertion holes 2 and 3 has appropriately been performed from the image captured by the image sensor 16 after application of the adhesive.

Figure 7:
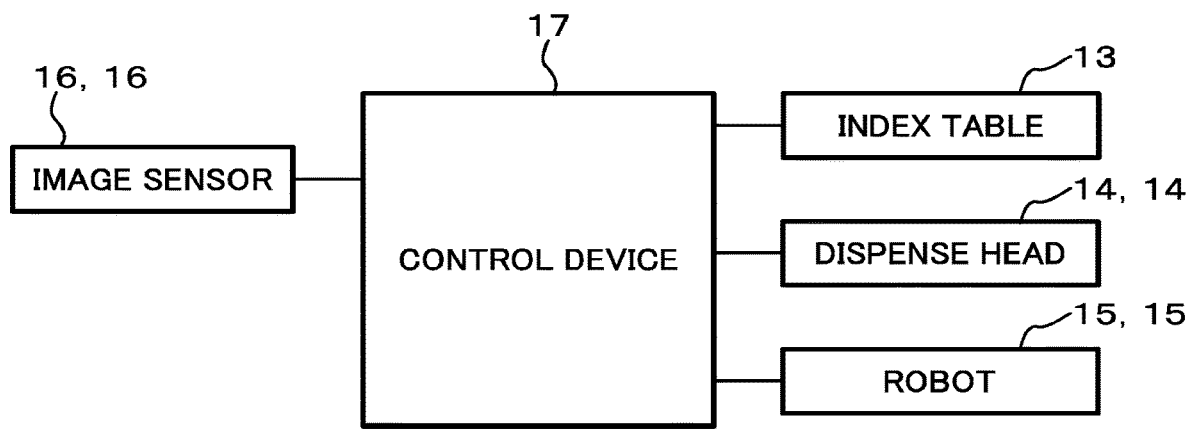
FIG. 7 is a block diagram schematically illustrating an electrical configuration according to the embodiment.

FIG. 7 schematically illustrates an electrical configuration around the control device 17. Here, the control device 17 is configured to include a computer, controls the index table 13, and controls the robots 15 and the dispense head 14. Also, signals from the image sensors 16 are input to the control device 17. Note that a configuration in which a monitor for displaying images captured by the image sensors 16 is provided such that an operator can check the images may also be employed. The control device 17 controls the index table 13, the robots 15, the dispense heads 14, and the like on the basis of a control program and operation data input and set in advance and sensor signals and the like input in real time. In this manner, the control device 17 causes the operation of applying the adhesive to the magnet insertion holes 2 and 3 of the rotor core 1 to be executed. In other words, each steps of the adhesive coating method according to the present embodiment including positioning of the rotor core 1, relative positioning of the nozzle 28 with respect to the rotor core 1, and moving of the nozzle 28 is caused to be executed.

In the adhesive coating device 11 according to the present embodiment, the control device 17 executes the following application operation. First, a positioning step of moving and positioning the rotor core 1 in a rotation direction is executed using the index table 13 such that one of the magnet insertion holes 2 and 3 as adhesive application target comes to the application position. In the state in which the rotor core 1 has been positioned, the direction in which the one of the magnet insertion holes 2 and 3 extends is parallel to the Y-axis direction. Next, an adhesive application step of causing the nozzle 28 located on the obliquely upper side to successively eject the microparticles A of the adhesive to the inner wall surface of the one of the magnet insertion holes 2 and 3 while the robot 15 causes the dispense head 14 to move is executed.

At this time, in the embodiment, the adhesive A is ejected and applied in the oblique direction at the inclination angle θ from the nozzle 28 of the dispense head 14 to the inner wall surface of the one of the magnet insertion holes 2 and 3 as described above. Then, the application is caused to be executed while the robot 15 cause the dispense head 14, that is, the nozzle 28 to move in a parallel direction. Specifically, a moving pattern of the nozzle 28 of the dispense head 14, that is, a trajectory along which the adhesive A comes into contact with the inner wall surface of the one of the magnet insertion holes 2 and 3 (the diagram in the direction of the arrow a in FIG. 5) is illustrated by the arrow in FIG. 6. For example, the nozzle 28 is moved (1) by a predetermined length corresponding to the width dimension of the one of the magnet insertion holes 2 and 3 from the front side to the back side, is then moved upward by a small amount, for example, by 1.8 mm and is then moved (2) by a predetermined length from the back side to the front side, and is moved upward again by a small amount.

Similar operations are repeated in (3), (4), and (5), and the adhesive is applied in a pattern of drawing five parallel lines, for example, in the inner wall surface of the one of the magnet insertion holes 2 and 3. The application speed is set to 70 mm/s, for example. In this case, since the direction in which the magnet insertion holes 2 and 3 extend is parallel to the Y-axis direction, the nozzle 28 of the dispense head 14 does not move in the X direction, and movement thereof is controlled in the Y-axis direction and the Z-axis direction. In this manner, the adhesive is supplied to the inner wall surface of the one of the magnet insertion holes 2 and 3 such that the adhesive spreads to be thin over the entire square range.

Also, in the present embodiment, the inspection step of imaging the adhesive applied to the inner wall surface of the one of the magnet insertion holes 2 and 3 using the image sensor 16 and checking whether or not the operation of applying the adhesive has appropriately been performed from the captured image is executed after the adhesive application step ends. In a case in which it is determined that a failure of coating of the adhesive to the inner wall surface of the one of the magnet insertion holes 2 and 3, for example, shortage of an application amount, non-application, or the like has occurred, an error notification or re-execution of the adhesive application step is performed. In a case in which it is determined that the supply of the adhesive has appropriately been performed from the captured image, the positioning step is executed such that the next one of magnet insertion holes 2 and 3 comes to the application position, and the adhesive application step is further executed.

The application operation including the aforementioned steps is alternately, successively, and repeatedly executed by the two robots 15, the two dispense heads 14, and the two image sensors 16 on the left and right sides. If the adhesive application operation for all the magnet insertion holes 2 and 3 ends, the rotor core 1 is fed to the next step, and an operation of inserting the permanent magnets to the magnet insertion holes 2 and 3 and causing the permanent magnets to adhere thereto, that is, a magnet insertion step is executed thereby to obtain a rotor.

According to the adhesive coating device 11 and the adhesive coating method of the present embodiment as described above, the following effects and advantages can be obtained. A jet-type dispenser that applies the adhesive in a non-contact manner by forming microparticles from the adhesive and linearly and successively ejecting the microparticles from the nozzle 28 is employed as each dispense head 14 in the present embodiment. For the dispense head 14, it is possible to employ the nozzle 28 with a very small diameter and to eject and apply the adhesive to the inner wall surfaces of the magnet insertion holes 2 and 3 even if the magnet insertion holes 2 and 3 are small.

At this time, the adhesive is ejected and applied in the oblique direction to the inner wall surfaces of the magnet insertion holes 2 and 3, and the inclination angle θ at that time is set to fall within the range between the minimum angle θs and the maximum angle θm obtained by the aforementioned equations, through the control of the relative positions of the nozzles 28. According to studies of the present inventors, it is possible to perform the application operation with high accuracy even on the small magnet insertion holes 2 and 3 through the ejection and application in such an oblique direction. The adhesive A is prevented from being applied to an unnecessary site, such as the surroundings of the opening parts of the magnet insertion holes 2 and 3, and it is possible to prevent contamination of other portions.

Also, the dispense head 14 has satisfactory responsiveness at the time of ejection of the adhesive, can achieve application at a high speed with small variations in application amounts, and can uniformly and stably apply the adhesive in a non-contact manner to the target position or range. Additionally, a significantly excellent effect that the application amount can be maintained constant without variations was able to be obtained in a test for evaluating variations in application amounts carried on by the present inventors.

Therefore, the present embodiment has an excellent effect that an adhesive application operation can be satisfactorily performed on thin magnet insertion holes 2 and 3 unlike a case in which a spatula is used as in the related art, in application of the adhesive for adhesion of the permanent magnets to the inner surfaces of the magnet insertion holes 2 and 3 with flat shapes in the rotor core 1.

The present embodiment is configured such that the application operation is executed while the nozzle 28 of the dispense head 14 is caused to move in parallel with the inner wall surface of each magnet insertion holes 2 and 3. In this manner, it is possible to apply the adhesive in a predetermined pattern like scanning by repeating the linear application of the adhesive to the inner wall surface of each magnet insertion holes 2 and 3 while causing the nozzle 28 to move in parallel. As a result, it is possible to stably perform the application operation with high application accuracy at a high speed over a wide range of the inner wall surfaces of the magnet insertion holes 2 and 3. It is thus possible to enhance the throughput and the yield.

Also, the present embodiment is configured to locate the nozzle 28 on the upper side of the rotor core 1 and perform the adhesive application operation from the upper side of the magnet insertion holes 2 and 3 directed in the up-down direction. In this manner, it is possible to bring the adhesive into contact with the inner wall surfaces of the magnet insertion holes 2 and 3 with higher accuracy and to more stably perform the application operation by ejecting and applying the adhesive from the upper side using the nozzle 28, as compared with a case of a horizontal orientation or an upward orientation.

Particularly, the present embodiment is configured to provide the image sensor 16, image the inner wall surfaces of the magnet insertion holes 2 and 3 using the image sensor 16, and check whether or not the adhesive application operation has appropriately been performed from the captured image. In this manner, it is possible to check a condition of the application of the adhesive to the inner wall surfaces of the magnet insertion holes 2 and 3, that is, the application amount, the application area, the application position, and the like on the basis of the image captured by the image sensor 16. Therefore, it is possible to prevent the processing from proceeding to the next step in an unsatisfactory application state and to reliably perform the application operation and thus a magnet adhesion operation.

Note that although the two-axis orthogonal coordinate-type robot is employed as the moving mechanism, that is, the robot in the adhesive coating device in the aforementioned embodiment, the invention is not limited thereto, and an articulated robot having three or more axes or the like may be employed. Also, a mechanism that causes the dispense head to move in the X direction or a mechanism that freely changes the angle of the dispense head, that is, the angle of the nozzle with respect to the holes may be added as the moving mechanism. A configuration in which the application operation is performed while the workpiece side is caused to move relative to the nozzle of the dispense head may also be employed. One or three or more dispense heads and robots may be provided to perform the application operation.

Although the rotor core 1 of the rotor for the rotating electrical machine has been exemplified as a target of the application of the adhesive in the aforementioned embodiment, the workpiece is not limited thereto, and various modifications can be made in regard to the shape of the holes or the like. Also, the checking step using the image sensor may be provided when needed. Moreover, it is a matter of course that various modifications can be made for a pattern in which the adhesive is applied to the inner wall surface of the hole, that is, a pattern in which the nozzle is moved. In addition, the specific numerical values of the inner diameter dimension and the inclination angle of the nozzle, the hole dimension, the drive frequency of the dispense head, the viscosity of the adhesive, and the like are just examples, and it is a matter of course that appropriate changes can be made.

The embodiment described above has been proposed as an example and is not intended to limit the scope of the invention. These novel embodiments can be performed in other various forms, and various omissions, replacements, and changes can be made without departing from the gist of the invention. These embodiments and modifications thereof are included in the scope and the gist of the invention and are also included in a range of the inventions described in the claims and equivalents thereof.

The invention claimed is:

1. An adhesive coating device for coating an inner wall surface of a hole of a workpiece provided with holes-with an adhesive, the device comprising:
   a table that holds the workpiece;
   a jet-type dispenser that applies the adhesive in a non-contact manner by forming microparticles from the adhesive in a liquid form and linearly and successively ejecting the microparticles from a nozzle;
   a robot that causes a relative position of the nozzle of the dispenser to freely move with respect to the hole of the workpiece; and
   a computer that controls the mechanism and causes the mechanism to automatically execute an operation of applying the adhesive, the operation including positioning of the workpiece, relative positioning of the nozzle with respect to the workpiece, and moving of the nozzle,
   wherein two pieces of the dispenser are symmetrically provided in a direction perpendicular to the direction in which the holes are extending, the two pieces of the dispenser are disposed in an inclined form with respect to the direction perpendicular to the direction in which the holes are extending, the adhesive is ejected and applied in an oblique direction from the nozzle to the inner wall surface of the hole, an angle of the oblique direction is such an angle that the adhesive linearly ejected from the nozzle located outside the hole is able to be applied to the inner wall surface of the hole with a desired depth without interfering with an opening part of the hole, and application of the adhesive is alternately performed by the two pieces of the dispenser.

2. The adhesive coating device according to claim 1, wherein the computer causes the coating to be executed while causing the nozzle to move in parallel with the inner wall surface of the hole.

3. The adhesive coating device according to claim 1, wherein the computer locates the nozzle above the workpiece and performs the operation of applying the adhesive from an upper side of the hole.

4. The adhesive coating device according to claim 1, further comprising
   an image sensor that images the inner wall surface of the hole,
   wherein the computer checks whether or not the operation of applying the adhesive has appropriately been performed from an image captured by the image sensor after application of the adhesive.

* * * * *